United States Patent [19] [11] 3,715,508
Blasbalg [45] Feb. 6, 1973

[54] SWITCHING CIRCUITS EMPLOYING ORTHOGONAL AND QUASI-ORTHOGONAL PSEUDO-RANDOM CODE SEQUENCES

[75] Inventor: Herman L. Blasbalg, Baltimore, Md.

[73] Assignee: International Business Machines Corporation, Armonk, N.Y.

[22] Filed: Sept. 15, 1967

[21] Appl. No.: 667,972

[52] U.S. Cl. ............179/15 BC, 179/15 AT, 178/22
[51] Int. Cl. ............H04m 3/00
[58] Field of Search............179/18 GF, 15 BC, 1.5 S; 178/22

[56] References Cited

UNITED STATES PATENTS 3,518,547 6/1970 Filipowsky ............179/15 BC
3,038,028 6/1962 Henze ............178/22
3,244,808 4/1966 Roberts ............178/6
3,484,554 12/1969 Gutleber ............179/15
3,488,445 1/1970 Chang ............179/15

OTHER PUBLICATIONS

Ballard, Orthogonal Multiplexing, "Space and Aeronautics," Tech. Ref. Series, Aerospace Electronics, Advanced Communications Nov. 1962 pgs. 51, 52, 59, 60.

*Primary Examiner*—Kathleen H. Claffy
*Assistant Examiner*—David L. Stewart
*Attorney*—Hanifin and Jancin and Peter R. Leal

[57] ABSTRACT

Switching circuits employing pseudo-random orthogonal or quasi-orthogonal code sequences to accomplish line to line or line group to line group switching in both a linear and nonlinear mode.

16 Claims, 22 Drawing Figures

INVENTOR
HERMAN L. BLASBALG
BY Peter R. Leal
AGENT

SWITCHING CIRCUITS EMPLOYING ORTHOGONAL AND QUASI-ORTHOGONAL PSEUDO-RANDOM CODE SEQUENCES

BACKGROUND OF THE INVENTION

Modern day switching terminals have made the solution of the problem of line to line or line group to line group switching one of utmost necessity. Several solutions have been proposed which, although satisfactory for some uses, are unsatisfactory for certain other uses.

Prior art switching systems suffer from being vulnerable to impulse noise and random noise and intelligent noise or cross-talk. As an example, time division switching systems, when subjected to impulse or random noise, may lose an entire time slot with resultant message error.

Further, many prior systems suffer from a low degree of message security. In such systems, it is possible for an unauthorized entity to tap into the switch and intercept the message.

It is therefore an object of the present invention to achieve a switching system, for performing line to line or group to group switching, which employs integration over a time period so as to be more effective when subjected to impulse noise and random noise.

It is another object of this invention to provide a secure switch impervious to message interception from unauthorized entities.

It is a further object of the present invention to provide a switching system with an improved load factor where increased loading under heavy traffic conditions causes gradual degradation in a random noiselike nature, rather than in catastrophic line or group failure.

It is a still further important object of the present invention to effect line to line or group to group switching of analog or digital data directly without the intermediate step of bandpass filtering.

BRIEF SUMMARY OF THE INVENTION

The invention relates to directly switching a message from a first line to a second line, or a group of messages from a first group of lines to a second group of lines, using orthogonal codes or using quasi-orthogonal codes. Switching can be between any two terminals or between cascades of terminals. Basically the switching is accomplished by setting a sending-end and a receiving-end pseudo-noise generator (PNG) to the same initial state and stepping each PNG synchronously. A pseudo-noise generator, often called an m-sequence generator comprises a feedback n stage shift register which, after initialization, will generate a sequence of digits which will not repeat until $2^n-1$ shifts have been accomplished. The theory of pseudo-noise generators is well known and will not be repeated here. However, reference is made to detailed explanations of pseudo-noise generators seen in copending applications Ser. No. 298,877 filed July 31, 1963 now U.S. Pat. No. 3,432,619, issued Mar. 11, 1969, and Ser. No. 378,302 filed June 26, 1964 now abandoned by the inventor of the present invention and assigned to the assignee of the present invention.

The pseudo-random sequence of the first PNG is combined, through multiplication or addition modulo-two, with a message sample from the sending line to form a first intermediate signal. At the receiving end, this first intermediate signal is combined with the pseudo-random sequence from the second PNG. Since both PNG's were initially set to the same state, the pseudo-random sequence from the second PNG will be identical to that of the first PNG. The combining of the first intermediate signal with the identical pseudo-random sequence will yield a second intermediate signal, the integral of which on the output line will yield the original message sample. This switching mechanism can be made to include linear or nonlinear multiplexing of several sending lines so as to switch each sending line to a different receiving line. Also, groups of sending lines can be switched to groups of receiving lines.

The foregoing objects, features and advantages of the invention will be apparent from the following more particular description of preferred embodiments of the invention, as illustrated in the accompanying drawings wherein.

SYNCHRONOUS ORTHOGONAL SWITCHING

The ability to switch a message on a given line of a first group to a given line of a second group depends on the concept of orthogonality. Two discrete N-dimensional vectors $x$, $y$ are said to be orthogonal if their correlation coefficient $\rho(x, y)$ is zero. The correlation coefficient of such vectors is given in general by $$\rho(x, y)=\frac{1}{N}\sum_{i=1}^{N} X_iY_i \qquad (1)$$

If $x$, $y$ are vectors of 1's and $-1$'s, then $$\rho(x, y)=\cos\phi \qquad (2)$$

where $\phi$ is the argument between $x$, $y$. Thus for $x$, $y$ to be orthogonal, $\phi=\pi/2$ and $\rho(x,y)=0$. When the vectors $x$, $y$ are binary codes, the correlation coefficient is given more generally by $$\rho(x, y)=(A-D)/N \qquad (3)$$

where $N$ is the code length (number of 1's plus number of 0's)

$A$ is the number of agreements of $x$ with $y$, and $D$ is the number of disagreements of $x$ with $y$.

Therefore, for the two codes to be orthogonal, $A = D$ which condition must prevail for a code length which is an even integer. If the code length is an odd integer, then the condition of orthogonality becomes $$\rho(x, y) = -1/N \quad (4)$$

which requires that $D = A+1$.

The above is a very brief summary of the theory of orthogonal codes. For a more thorough discussion of orthogonality the reader is referred to the text *Digital Communications* by S. N. Golomb, et al., Prentice-Hall, Inc., 1964, pp. 47–62.

DETAILED DESCRIPTION OF FIG. 1A

Figure 1A:
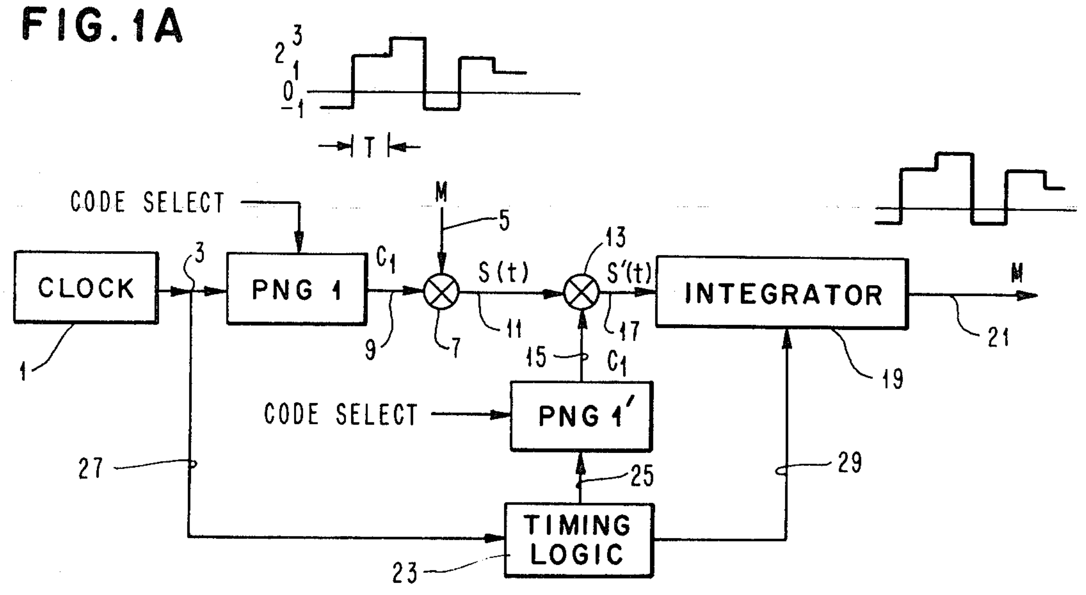
FIG. 1A shows a representation of a low pass to low pass, or bandpass to bandpass switch according to the invention.

Referring to FIG. 1A, there is seen the basic switching circuit for directly switching a message from a first line to a second line. A first pseudo-noise generator PNG1 is connected to an initializer operative by loading a number into PNG1 over CODE SELECT line. The initializer may be of any well known type, the details of which do not form a part of this invention. Such a loading means may be seen in the above-referenced copending application Ser. No. 298,877. Clock 1 is connected to PNG1 via line 3. A first line 5, over which message M is to be transmitted is connected to combining means 7. PNG1 is also connected to combining means 7 via line 9. Combiner 7 may be of any well known type such as a multiplier for sampled analog data or a modulo-two adder for digital data.

The output line 11 of combiner 7 is connected as a first input to a second combiner 13 similar to combiner 7. A second pseudo-noise generator, PNG1', is connected as a second input to combiner 13 via line 15. The output of combiner 13 is connected via line 17 to integrator 19. The output of integrator 19 is the reconstructed message M over line 21 which is the second line to which the message M from said first line 5 is to be connected.

PNG' is driven by timing logic 23 via line 25. Clock 1 is connected to timing logic 23 via line 27. Timing logic 23 also drives integrator 19 via line 29. Timing logic 23 may be any well known timing means, the details of which do not form a part of this invention. However, the timing logic should be such, for example, that PNG1 is driven at the same rate as clock 1, while integrator 19 is read out once each message sample time. It is to be recognized by those skilled in the art that the above timing specification is illustrated only and may be changed as the application demands, without departing from the spirit and scope of the invention.

Thus it can be seen that PNG1 is associated with the first line 5, while PNG1' is associated with the second line 21.

Also seen in FIG. 1A is a graphical representation of the input and reconstructed message M. For example, the message M may be, illustratively, sampled analog with a sample duration of predetermined interval T.

OPERATION OF FIG. 1A

Moving on to a discussion of the operation of the switch of FIG. 1A, attention is invited to FIGS. 2A–2E. It will be noted at the outset that the switch of FIG. 1A can be used for either low pass to low pass switching, or bandpass to bandpass switching, depending on the frequency range of integrator 19.

Figure 2A:
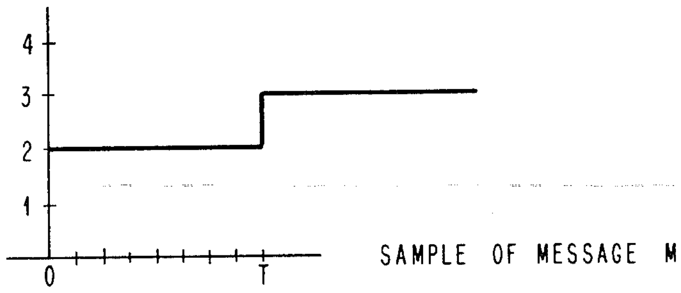
FIGS. 2A–2E show a graphical representation of the waveforms at strategic points in the switch of FIG. 1A.
Figure 2B:
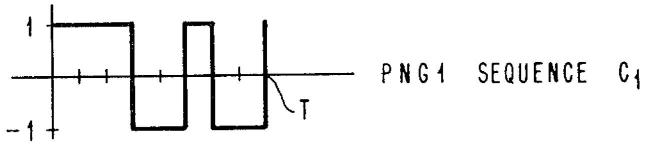
Figure 2C:
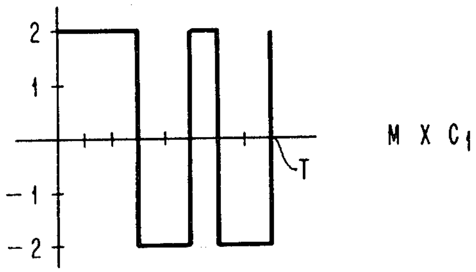
Figure 2D:
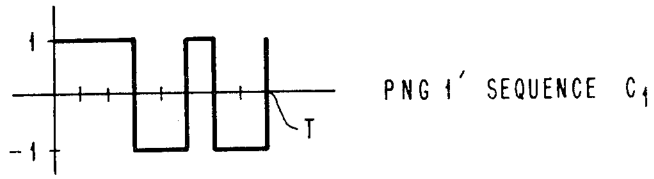
Figure 2E:
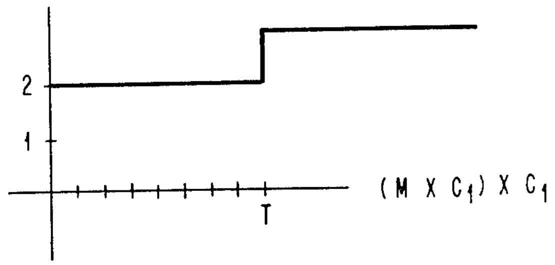

Seen in FIG. 2A is an enlarged presentation of representative message sample of predetermined interval T from FIG. 1A. The generator PNG1 is initialized to a given state over CODE SELECT line to generate an orthogonal pseudo-random, or pseudo-noise, sequence. PNG1' is initialized to an identical state to that of PNG1. Hence, upon being driven at the clock rate, both PNG1 and PNG1' will generate identical orthogonal pseudo-random sequences. As the sample of message M is transmitted over line 5, PNG1 is driven by clock 1 to generate pseudo-noise (PN) sequence C1 during each sample time T. PN sequence C1 is seen graphically in FIG. 2B and can be seen to be the sequence 111–1–11–1–1. This eight-bit code is chosen for illustrative purposes only. PN sequence C1 is combined with each message bit of M in combiner 7 to form a first intermediate signal $s(t)$. Illustratively, FIG. 2C shows this combining of the sample of FIG. 2A (a two) with the sequence C1 of FIG. 2B for the case in which combiner 7 is a multiplier. As seen from FIG. 2C, the operation is:

| | | | | | | | | |
|---|---|---|---|---|---|---|---|---|
| M | 2 | 2 | 2 | 2 | 2 | 2 | 2 | 2 |
| C1 | 1 | 1 | 1 | −1 | −1 | 1 | −1 | −1 |
| M×C1 | 2 | 2 | 2 | −2 | −2 | 2 | −2 | −2 |

Hence the result is the vector 222–2–22–2–2 having predetermined interval T. This first intermediate signal is now combined via line 11 and second combiner 13 with the PN sequence from PNG1' via line 15 to form a second intermediate signal $s'(t)$.

As originally stipulated, PNG1' was originally initialized identically with PNG1 so that the PN sequence of PNG1' is identical to that of PNG1, namely C1. It is to be noted that though PNG1 and PNG1' are both driven at a common clock rate, allowances may have to be made for finite time delays of the switch, such of the length of line 11 and the various circuit transient times. However, these details fall under the category of engineering design and will not be discussed further here.

As mentioned above, the first intermediate signal $s(t)$ is combined in second combiner 13 with PN sequence C1 from PNG1'. C1 is seen in FIG. 2D and, again, is 111–1–11–1–1. This combining operation is as follows:

| | | | | | | | | |
|---|---|---|---|---|---|---|---|---|
| $s(t)$ = M×C1 = | 2 | 2 | 2 | −2 | −2 | 2 | −2 | −2 |
| C1 = | 1 | 1 | 1 | −1 | −1 | 1 | −1 | −1 |
| (M×C1)×C1 = | 2 | 2 | 2 | 2 | 2 | 2 | 2 | 2 |

Thus, the original message sample which was a 2, or the vector 22222222, appears as a second intermediate signal $s'(t)$ on line 17, and is the input to integrator 19. Integrator 19 takes the sum of the vector which is 16 and normalizes it. The normalization is necessary since the form of C1 is a normalized PN sequence. For the PN sequence length given, normalization is performed within integrator 19 by dividing the sum by 8. Thus 16/8 = 2 which gives the reconstructed message sample on second line 21 to which message M was to be switched from first line 5. The operation proceeds similarly for each sample with the result that the entire message M is switched from a first line 5 to a second line 21.

Figure 1B:
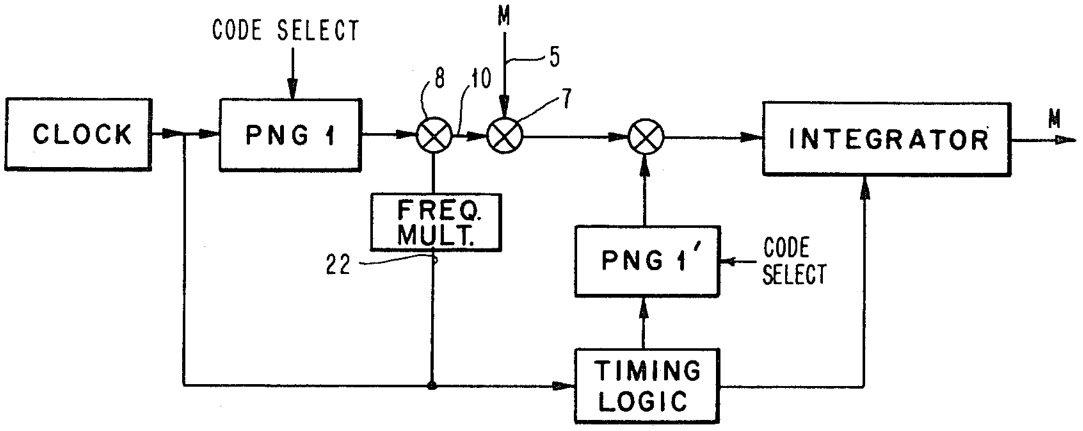
FIG. 1B shows a representation of a low pass to bandpass switch according to the invention.

FIG. 1B shows a switching circuit according to the invention, useful in switching from low pass to bandpass. The circuit is similar to the circuit of FIG. 1A with the exception that the clock frequency is mixed with the PN sequence from PNG1 in combiner 8 via line 22, so as to shift the PN sequence up to bandpass before combining with the low pass message M in combiner 7. Further, timing logic 23 is such as to synchronize the output of PNG2 with said shifted PN sequence. Other than the above described modification, the structure and operation of the switch of FIG. 1B is substantially the same as that of FIG. 1A It will be noted by those skilled in the art that the PN sequence of PNG1 can also be mixed with a submultiple of the clock, or with a harmonic of the clock to shift the PN sequence to virtually any frequency range. This can be accomplished by including any well known frequency divider or frequency multiplier, respectively in line 22 of FIG. 1B.

DETAILED DESCRIPTION OF FIG. 3

Figure 3:
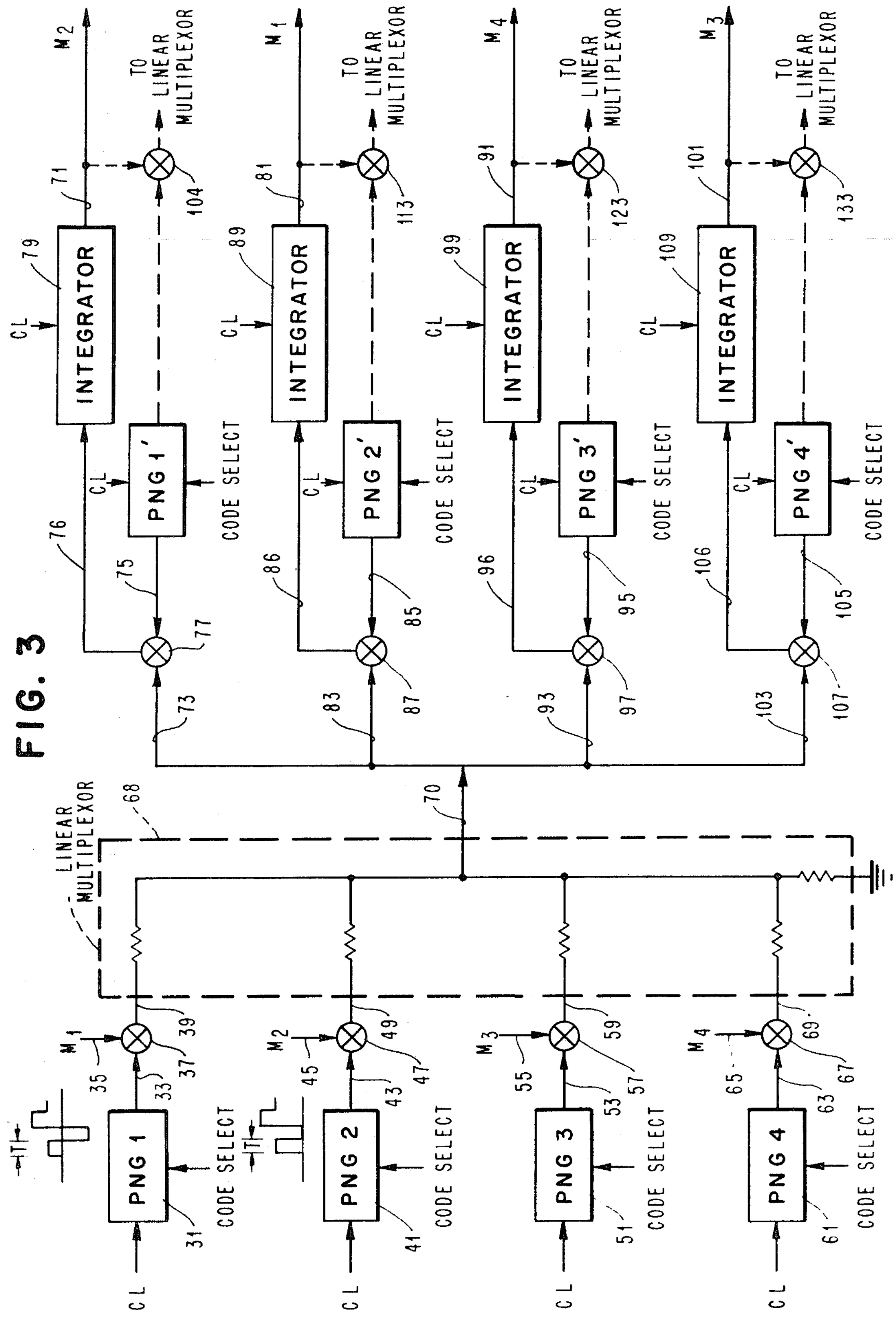
FIG. 3 shows a representation of a line to line switch utilizing linear multiplexing.

A representation of a switching circuit employing orthogonal codes for switching individual lines of a first group of lines to individual lines of a second group of lines is seen in FIG. 3.

In FIG. 3 is seen a first group of individual sending lines 35, 45, 55, 65, each of which is capable of having messages M1, M2, M3, M4 transmitted thereover, respectively. Each message may be digital or sampled analog, and comprises data samples of predetermined interval T as shown illustratively. Also seen in FIG. 3 is a group of pseudo-noise generators PNG1, PNG2, PNG3, PNG4, each respective PNG associated with a respective individual line of said first group and each having an output line 33, 43, 53, 63. Each PNG of the group of PNG's are driven synchronously by a single clock. This clock is similar to that of clock 1, but is not shown in FIG. 3 to keep the drawing from being unduly clattered.

Also seen in FIG. 3 is a first group of combining means 37, 47, 57, 67. Each combining means, which may be a multiplier or a modulo-two adder, has one of said individual lines from said first group and one of said output lines from said one of said first group of PNG's as input lines. Each combiner also has an output line. For example, combiner 37 has individual line 35 and PNG1 output line 33 as a pair of inputs, and has output line 39. Similarly, combiner 47 has inputs 45 and 43, and output 49; combiner 57 has inputs 55 and 53, and output 59; combiner 67 has inputs 65 and 63, and output 67.

Linear multiplexing means 68 is provided which may comprise, for example, a Kirchoff adder. The respective output lines 39, 49, 59, 69 of each combiner of said first group of combiners are inputs to linear multiplexer 68 which has output line 70.

A second group of individual receiving lines 71, 81, 91, 101, are provided, to which the messages on said first group of lines 35, 45, 55, 65 are to be switched. Each of said second group of lines is shown as receiving a given message switched from said first group of lines. For example, line 71 is to receive message M2 from line 45, line 81 is to receive message M1 from line 35, line 91 is to receive message M4 from line 65, and line 101 is to receive message M3 from line 55. As will be recognized to those skilled in the art, the above sequence of switching is illustrative only, and any other switching permutation or combination may be used.

Also seen in FIG. 3 is a second group of pseudo-noise generators PNG1′, PNG2′, PNG3′, PNG4′. Each PNG has a respective output line 75, 85, 95, 105 and is associated with a respective one of said second group of lines 71, 81, 91, 101. For example, PNG1′ is associated with line 71, PNG2′ with line 81, PNG3′ with 91, and PNG4′ with 101, as will become more apparent hereinafter. Also shown is a second group of combiners 77, 87, 97, 107, which may be, for example, multipliers or modulo-two adders. As can be seen, line 70 from linear multiplexer 68 feeds lines 73, 83, 93, 103. Each of said second group of combiners has a respective one of said named lines as a first input, the output line from a respective PNG of said second group of PNG's as a second input, as well as having an output line. Thus, combiner 77 has inputs 73 and 75 and output line 76, combiner 87 has inputs 83 and 85 and output line 86, combiner 97 has input 93 and 95 and output line 96, and combiner 107 has inputs 103 and 105 and output line 106. Each of said output lines is connected as an input to an integrator which is in turn connected to an individual line of said second group of individual receiving lines. Thus, line 76 is connected to the input of integrator 79 the output of which is in turn connected to line 71. Line 86 is connected to the input of integrator 89 the output of which is connected to line 81. Line 96 is connected to the input of integrator 99, the output of which is connected to line 91. Line 106 is connected to the input of integrator 109, the output of which is connected to line 101.

It is to be noted that PNG1′ through PNG4′ are driven synchronously with the clock driving PNG1 through PNGH in the same manner PNG1 and PNG1′ of FIG. 1A were driven. Such driving means are shown in FIG. 3 as the clock input CL to prevent cluttering of the drawing. Likewise, integrators 79 through 109 are driven via input CL in a manner similar to integrator 19 of FIG. 1A. Finally, each PNG of FIG. 3 has provision to be initialized via CODE SELECT line in a manner similar to that of PNG1 and PNG1′ of FIG. 1A. Also shown is a third group of combiners 103, 113, 123, and 133, which may be multipliers or modulo-2 adders, such as the combiners of the first or second groups. Each combiner of the third group of combiners has a first input connected to the output of a respective integrator and a second input connected to an output of it s respective pseudo-noise generator from the second group of pseudo-noise generators. The third group of combiners is shown to make it clear that switching circuits as described in FIG. 3 can be connected in series thereby generating switching networks of any complex ligical design. When used in series with another switching stage, the switch of the instant invention only requires one pseudo-noise generator for each line switched because the pseudo-noise generator of the previous stage can be used to form the intermediate signals which form the inputs to a multiplexor.

OPERATION OF FIGURE 3

Operation of the switching circuit of FIG. 3 will be explained with reference to FIGS. 4A through 4I. For ease of illustration, the switching circuit of FIG. 3 will be considered to be switching massage M1 from line 35 to line 81 and message M2 from line 45 to line 71.

Figures 4A, 4B, 4C, 4D, 4E, 4F:
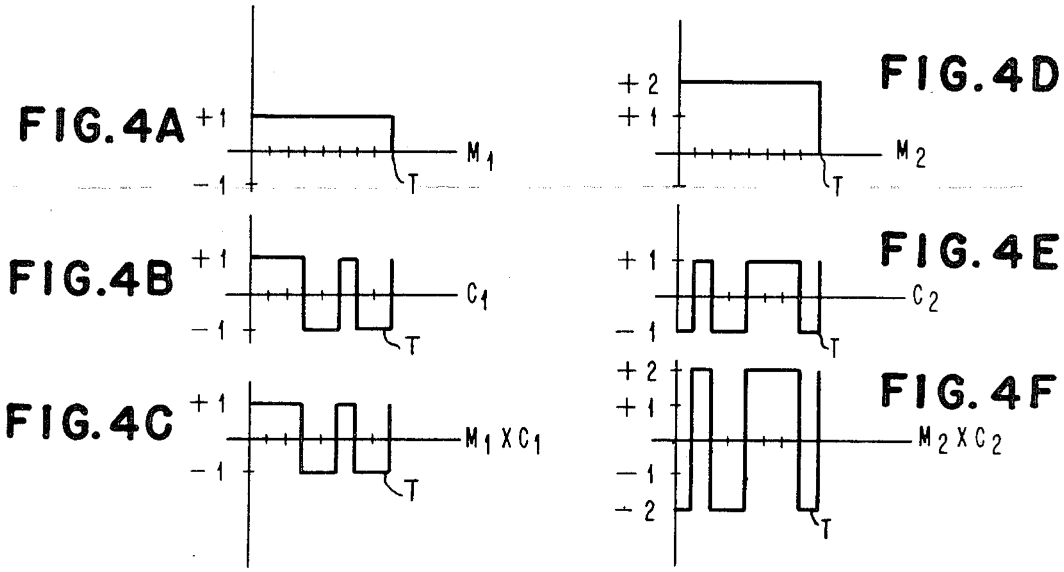
FIGS. 4A–4I show a graphical representation of waveforms at strategic points in the switch of FIG. 3.

Messages M3 and M4 can be switched in a similar manner to that described below but will be disregarded in the present analysis merely for ease of illustration. A given sample of message M1 of predetermined interval T is seen in FIG. 4A. It is noted that this sample has a value of +1. A corresponding sample from M2, of value +2 is seen in FIG. 4D. PNG1 and PNG2 are initialized to a given state to generate two PN sequences, C1 and C2, respectively, which are orthogonal to each other according to the above definition of orthogonality. For illustrative purposes 8 bit normalized codes will be used. Each are seen in FIGS. 4B and 4E, respectively and are given as C1 = 111-1-11-1-1 and C2 = -11-1-1111-. As can be seen, A = D as required by equation 3.

The sample of message M1 on line 35 is combined with C1 from PNG1 at the clock rate over line 33 in combiner 37. Message M2 on line 45 is combined with C2 from PNG2 over line 43 in combiner 47. The operation is as follows:

COMBINER 37

| | | | | | | |
|---|---|---|---|---|---|---|
| Sample of M11 | 1 | 1 | 1 | 1 | 1 | 1 |
| 1 | | | | | | |
| C11 | 1 | 1 | −1 | −1 | 1 | −1 |
| −1 | | | | | | |
| (M1×C1)1 | 1 | 1 | −1 | −1 | 1 | −1 |
| −1 | | | | | | |

COMBINER 47

| | | | | | | |
|---|---|---|---|---|---|---|
| Sample of M22 | 2 | 2 | 2 | 2 | 2 | 2 |
| 2 | | | | | | |
| C2−1 | 1 | −1 | −1 | 1 | 1 | 1 |
| −1 | | | | | | |
| (M2×C2)−2 | 2 | −2 | −2 | 2 | 2 | 2 |
| −2 | | | | | | |

The result of these operations is that a first intermediate signal is formed on each of lines 39 and 49, which signals are graphically illustrated in FIGS. 4C and 4F, respectively. Next, these two first intermediate signals are linearly multiplexed in linear multiplexer 68 and the result on line 70 is a group of first intermediate signals seen in FIG. 4G. The operation in the linear multiplexer is essentially linear addition of all first intermediate signals to form the group, as shown below:

| | | | | | | |
|---|---|---|---|---|---|---|
| (M1×C1)1 | 1 | 1 | −1 | −1 | 1 | −1 |
| −1 | | | | | | |
| (M2×C2)−2 | 2 | −2 | −2 | 2 | 2 | 2 |
| −2 | | | | | | |
| [(M1×C1)+(M2×C2)]−1 | 3 | −1 | −3 | 1 | 3 | 1 |
| −3 | | | | | | |

At substantially the same time as PNG1 and PNG2 initialized, PNG1′ and PNG2′ were initialized such that when driven at the clock rate, PNG2′ will generate C1 (the orthogonal PN sequence of PNG1) and PNG1′ will generate C2 (the orthogonal PN sequence of PNG2). Thus the receiving line of the second group to which the message from a sending line from the first group is to be switched is designated by initializing the PNG associated with the receiving line to generate the identical orthogonal PN sequence as that generated by the PNG associated with said sending line. This is illustrated for PNG2′ generating C1 over line 85 and combining it with the group of first intermediate signals over line 83. The resulting operation "picks out" the component of the group of first intermediate signals due to original combining with the orthogonal PN sequence of the PNG associated with the sending line For the present example this operation is as follows:

| | | | | | | | |
|---|---|---|---|---|---|---|---|
| Line 70 [(M1×C1)+ | −1 | 3 | −1 | −3 | 1 | 3 | 1 |
| | −3 | | | | | | |
| (M2×C2)] | | | | | | | |
| | 1 | 1 | 1 | − | −1 | 1 | −1 |
| | −1 | | | | | | |
| Line 76 [(M1×C1)+ (M2×C2)]×C1 | −1 | 3 | −1 | 3 | −1 | 3 | −1 |
| | 3 | | | | | | |

Figures 4G, 4H, 4I:
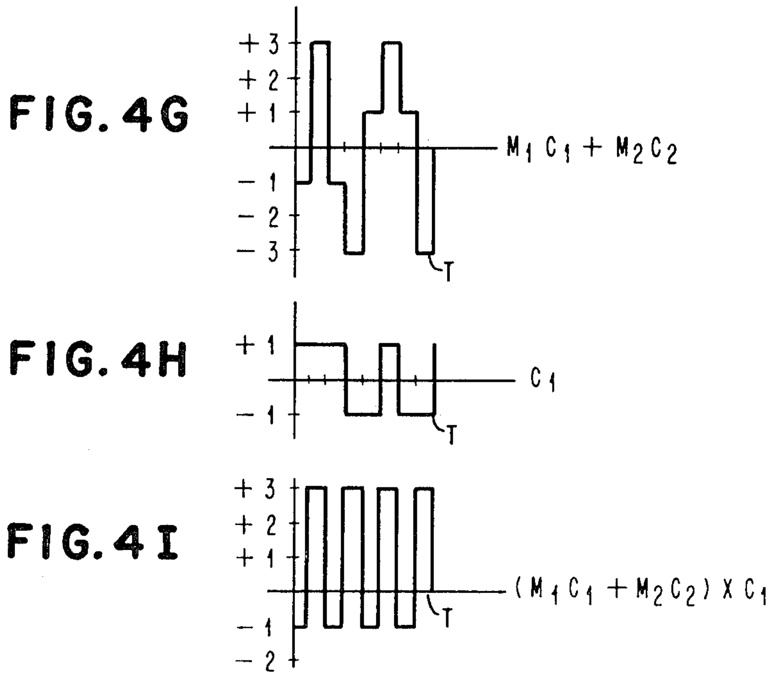

The result of this operation is seen in FIGS. 4H and 4I and appears as a second intermediate signal on line 86. This signal is transmitted to integrator 89 which integrates and normalizes the signal as did integrator 19 of FIG. 1A. Hence the reconstructed message sample is a 1 bit. That is, (−1) + (3) + (−1) + (3) + (− 1) + (3) + (−1) + (3) = 8, which when normalized for an 8 bit orthogonal code is 1. PNG1′ will generate C2 and message reconstruction operates similar to the above described operation. Thus line to line switching has been accomplished.

DETAILED DESCRIPTION OF FIGURE 5

Figure 5:
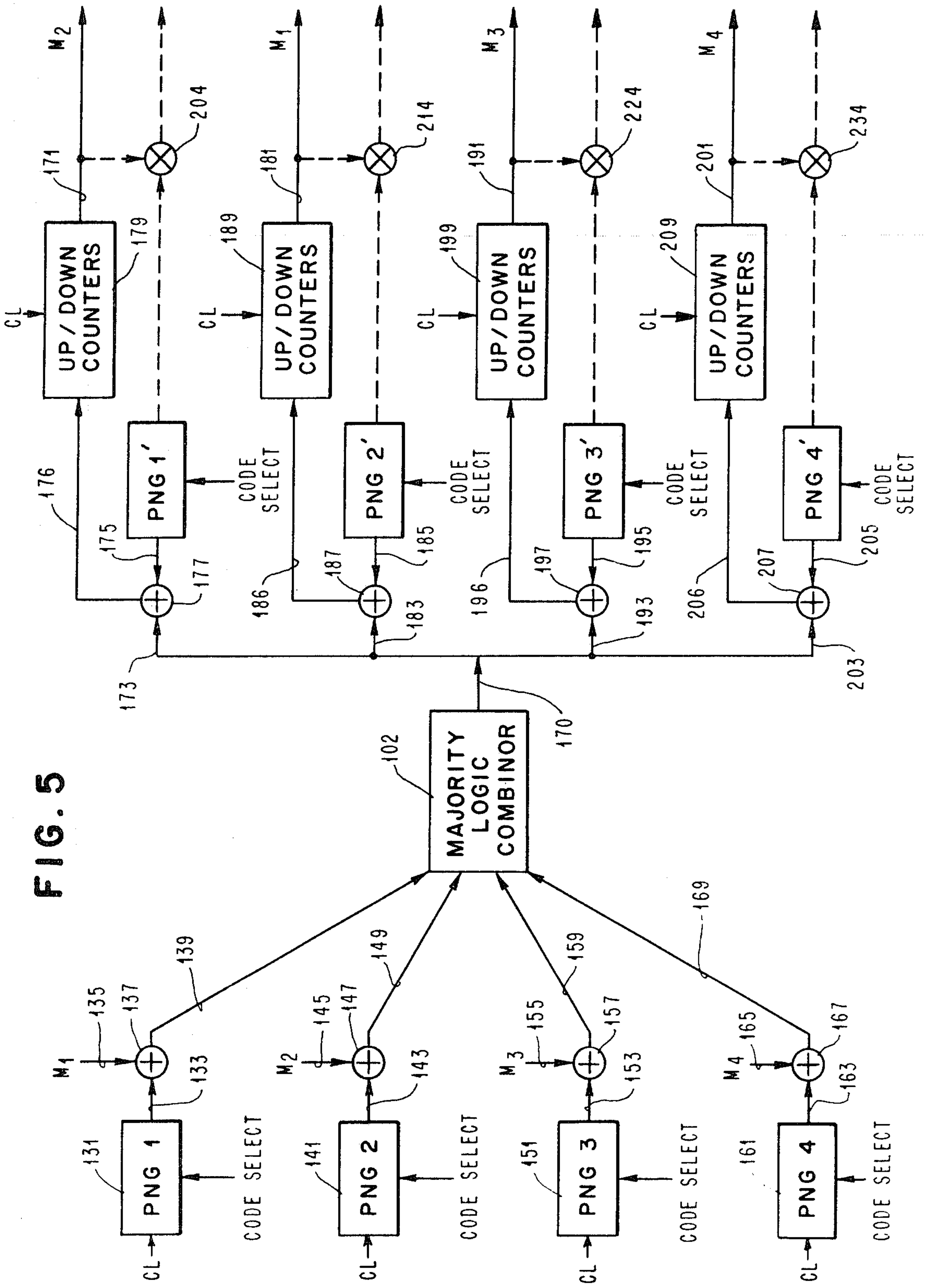
FIG. 5 is a representation of a line to line switch according to the invention, utilizing nonlinear multiplexing.

Referring now to FIG. 5 there is seen a switching circuit utilizing orthogonal codes according to the invention, wherein non-linear multiplexing means 102 is used instead of linear multiplexing means 68 as was done in FIG. 3. Nonlinear multiplexing means 102 may be a majority logic combiner. The output of majority logic combiner 102 on line 70 is a 1 if the majority of bits into the combiner is a 1 and is a 0 if the majority of bits is not 1. For FIG. 5, operation will be illustrated wherein combiners 137, 147, 157, 167 and 177, 187, 197, 207 are modulo-two adders and the data inputs M1 . . . M4 are digital binary bits. Previous illustrations showed sampled analog data utilizing combinations of 1's and −1's which required multipliers as combiners. For binary digital data, 1's and 0's are used and the combiners are modulo-2 adders. A further modification is that instead of integrators as in FIG. 3, well known up/down counters are used as shown. A third group of combiners 204,214, 224, 234 is also shown in FIG. 5, for the purposes of indicating that the switching circuit of FIG. 5 can also be connected into a switching network having switch elements in series.

OPERATION OF FIGURE 5

An example of operation follows. Assume that a 1 bit of duration T is transmitted over line 135 as a part of message M1. Further assume the corresponding bit in M2 is an 0 and the corresponding bit in M3 is a 1. For the present example, assume PNG1 is initialized to generate PN sequence C1′ = 11100100. PNG2 is initialized to generate the sequence C2′ = 11001001 and PNG3 is initialized to generate the pseudo-noise sequence C3′ = 1001011. Only three message bits will be considered for this illustration. Message M1 is to be switched to line 181. Message M2 is to be switched to line 171 and message M3 is to be switched to line 191. Each message bit is combined in its combiner with the pseudo-noise sequence from its respective pseudo-noise generator. Note that each PN sequence is orthogonal to every other PN sequence. The result of this first combination is as shown below. The operation at combiner 137 is:

| | | | | | | | | |
|---|---|---|---|---|---|---|---|---|
| M1 Bit | 1 | 1 | 1 | 1 | 1 | 1 | 1 | 1 |
| C1′ | 1 | 1 | 1 | 0 | 0 | 1 | 0 | 0 |
| Line 39 (M1 Bit + C1′) | 0 | 0 | 0 | 1 | 1 | 0 | 1 | 1 |

The operation at combiner 147 is:

| | | | | | | | | |
|---|---|---|---|---|---|---|---|---|
| M2Bit | 0 | 0 | 0 | 0 | 0 | 0 | 0 | 0 |
| C2′ | 1 | 1 | 0 | 0 | 1 | 0 | 0 | 1 |
| Line 149 (M2 Bit + C2′) | 1 | 1 | 0 | 0 | 1 | 0 | 0 | 1 |

The operation at combiner 157 is:

| | | | | | | | | |
|---|---|---|---|---|---|---|---|---|
| M3 Bit | 1 | 1 | 1 | 1 | 1 | 1 | 1 | 1 |
| C3′ | 1 | 0 | 0 | 1 | 0 | 0 | 1 | 1 |
| Line 159 (M3Bit + C3′) | 0 | 1 | 1 | 0 | 1 | 1 | 0 | 0 |

Each of the above results is nonlinearly multiplexed in majority logic combiner 102. That is, the sequence 00011011 is transmitted over line 139 to majority logic combiner 102, the sequence 11001001 is transmitted over line 149 to majority logic combiner 102 in the sequence 01101100 is transmitted over line 159 to majority logic combiner 102. The output of majority logic combiner forms an intermediate signal which is the majority of each input position as seen below:

| | | | | | | | | |
|---|---|---|---|---|---|---|---|---|
| Input on line 139 | 0 | 0 | 0 | 1 | 1 | 0 | 1 | 1 |
| Input on line 149 | 1 | 1 | 0 | 0 | 1 | 0 | 0 | 1 |
| Input on line 159 | 0 | 1 | 1 | 0 | 1 | 1 | 0 | 0 |
| Majority output 170 | 0 | 1 | 0 | 0 | 1 | 0 | 0 | 1 |

Thus the sequence over the interval T on line 170 is 01001001. This input is fed to line 173, 183, 193, 203. As with FIG. 3, each of the pseudo-noise generators PNG1′, . . ., PNG′ indicates the line to which a message on a given sending line is to be switched by being initialized to the same initial state as the pseudo-noise generator associated with that sending line. That is, PNG2′ is initialized to the same initial state as PNG1, PNG1′ to that of PNG2 and PNG3′ to that of PNG3. Thus PNG2′ will generate, when stepped by the clock (not shown) the PN sequence C1′, PNG1′ will generate PN sequence C2′, and PNG3′ will generate the PN sequence C3′. Each of these sequences will be combined in mod-2 adders 187, 177, and 197, respectively with the intermediate signal (sequence 01001001) over line 170. The operation is as follows:

The operation at combiner 177 is:

| | | | | | | | | |
|---|---|---|---|---|---|---|---|---|
| Majority output 173 = | 0 | 1 | 0 | 0 | 1 | 0 | 0 | 1 |
| C2′ = | 1 | 1 | 0 | 0 | 1 | 0 | 0 | 1 |
| Line 176 (Majority + C2′)= | 1 | 0 | 0 | 0 | 0 | 0 | 0 | 0 |

The operation at combiner 187 is:

| | | | | | | | | |
|---|---|---|---|---|---|---|---|---|
| Majority output 183 = | 0 | 1 | 0 | 0 | 1 | 0 | 0 | 1 |
| C1′ = | 1 | 1 | 1 | 0 | 0 | 1 | 0 | 0 |
| Line 186 (majority + C2′) = | 1 | 0 | 1 | 0 | 1 | 1 | 0 | 1 |

The operation at combiner 197 is:

| | | | | | | | | |
|---|---|---|---|---|---|---|---|---|
| Majority output 193 = | 0 | 1 | 0 | 0 | 1 | 0 | 0 | 1 |
| C3′ = | 1 | 0 | 0 | 1 | 0 | 0 | 1 | 1 |
| Line 196 (Majority +C3′) = | 1 | 1 | 0 | 1 | 1 | 0 | 1 | 0 |

Thus, the outputs of variations 177, 187, 197 and 207 are as seen above. In order to reconstruct the message bit on lines 171, 181, 191, 201, it is necessary to utilize polarity checking. That is, the up/down counters will count the number of agreements minus the number of disagreements for the output of each combiner and normalize the result. In each combiner output sequence, the 0's are defined as agreements and the 1 's as disagreements. Thus the up/down counters 179, 189, 199, 209 perform the function [(A–D)/N]. If a positive number results, the reconstructed bit is a zero. If a negative number results, the reconstructed bit is a one. This procedure may be termed digital integration. If sampled analog had been used, as in FIG. 3 normal integrators would have been used for elements 179, 189, 199, 209.

The operation at each up/down counter of interest is as follows:

Up/Down counter 179

1 0 0 0 0 0 0 0

D A A A A A A A (A–D)/N = (7 –1)/8 = +¾

Since the result at up/down counter 179 is positive, the reconstructed message bit on line 171 from message M2 of line 145 is a zero, as was originally sent.

Up/down counter 189 1 0 1 0 1 1 0 1

D A D A D D A D (A–D)/N = 3–5)/8 = –¼

Since the result at up/down counter 189 is negative, the reconstructed message bit on line 181 from message M1 of line 135 is a one, as was originally sent.

Up/down counter 199

1 1 0 1 1 0 1 0

D D A D D A D A (A–D)/N = (3–5)/8 = – ¼

Since the result at up/down counter 199 is negative, the reconstructed message bit on line 191 from message M3 of line 155 is a one, as was originally sent.

Thus a switching circuit has been shown which can switch messages from a given sending line to a given receiving line using orthogonal codes and a nonlinear multiplexing scheme.

SYNCHRONOUS QUASI-ORTHOGONAL SWITCHING

Up to this point the invention has been concerned with switching using orthogonal codes. However, the number of orthogonal PN sequences is limited. For this reason, a slightly less ideal case is utilized according to the invention, and PN sequences having a low (other than zero) cross-correlation function can be utilized as the PN sequence for each set of pseudo-noise generatore according to the invention. Such a PN sequence is called a quasi-orthogonal sequence. For a more thorough discussion of quasi-orthogonal sequences, the reader is referred to the mentioned copending application Ser. No. 298,877.

SYNCHRONOUS QUASI-ORTHOGONAL OPERATION OF FIG. 5

An example will be shown relative to the circuit of FIG. 5, but using quasi-orthogonal (that is, almost orthogonal) PN sequences. Again M1 is to be switched from line 135 to line 181, M2 from line 145 to line 171, M3 from line 151 to line 191. For this example, C1′ will be equal to 11100000. C2′ will be equal to 11001001 and C3′ will be equal to 10011011. When compared with the PN sequences C1′, C2′, and C3′ of the previous example, it will be seen that C1′ of this example has its fifth bit inverted from zero to one thus making it nonorthogonal with the other PN sequences. Likewise, C3′ of this example has the fifth bit shifted relative to C3′ of the previous example. The same message bits as in the previous example are assumed. Continuing as with the previous example, the operations are as follows:

The operation at combiner 137 is:

| | | | | | | | | |
|---|---|---|---|---|---|---|---|---|
| M1 Bit = | 1 | 1 | 1 | 1 | 1 | 1 | 1 | 1 |
| C1′ = | 1 | 1 | 1 | 0 | 0 | 0 | 0 | 0 |
| Line 139 (M1 Bit = +C1′) | **0** | **0** | **0** | **1** | **1** | **1** | **1** | **1** |

The operation at combiner 147 is:

| | | | | | | | | |
|---|---|---|---|---|---|---|---|---|
| M2 Bit = | 0 | 0 | 0 | 0 | 0 | 0 | 0 | 0 |
| C2′ = | 1 | 1 | 0 | 0 | 1 | 0 | 0 | 1 |
| Line 149 (M2 Bit = +C2′) | 1 | 1 | 0 | 0 | 1 | 0 | 0 | 1 |

The operation at combiner 157 is:

| | | | | | | | | |
|---|---|---|---|---|---|---|---|---|
| M3 Bit = | 1 | 1 | 1 | 1 | 1 | 1 | 1 | 1 |
| C3′ = | 1 | 0 | 0 | 1 | 1 | 0 | 1 | 1 |
| Line 159 (M3 Bit = +C3′) | 0 | 1 | 1 | 0 | 0 | 1 | 0 | 0 |

The output of majority logic combiner 102 which is a first intermediate signal over line 170 is:

| | | | | | | | | |
|---|---|---|---|---|---|---|---|---|
| Line 139 | 0 | 0 | 0 | 1 | 1 | 1 | 1 | 1 |
| line 149 | 1 | 1 | 0 | 0 | 1 | 0 | 0 | 1 |
| line 159 | 0 | 1 | 1 | 0 | 0 | 1 | 0 | 0 |
| line 170 | 0 | 1 | 0 | 0 | 1 | 1 | 0 | 1 |

The combined intermediate signal on line 170 is then transmitted to each line 173, 183, 193, 203 and again mixed with these PN sequences from the pseudo-noise generators of the receiving side of the switch. Again, since M1 is to be switched to line 181, PNG2′ will be set to generate PN sequence C1′. Since message M2 is to be switched to line 171, PNG1′ is initiated to generate PN sequence C2′. M3 is to be switched to line 191 so that PNG3′ is initiated to generate C3′. These sequences are generated, as usual, in synchronism with the sending side pseudo-noise generators. The operation at each receiving side combiner 177, 187, 197 is as follows:

The operation at combiner 177 is:

| | | | | | | | | |
|---|---|---|---|---|---|---|---|---|
| Majority output 173 = | 0 | 1 | 0 | 0 | 1 | 1 | 0 | 1 |
| C2′ = | 1 | 1 | 0 | 0 | 1 | 0 | 0 | 1 |
| Line 176 (Majority + C2′) = | 1 | 0 | 0 | 0 | 0 | 1 | 0 | 1 |

The operation at combiner 187 is:

| | | | | | | | | |
|---|---|---|---|---|---|---|---|---|
| Majority output 183 = | 0 | 1 | 0 | 0 | 1 | 1 | 0 | 1 |
| C1′ = | 1 | 1 | 1 | 0 | 0 | 0 | 0 | 0 |
| Line 186 (Majority + C1′) = | 1 | 0 | 1 | 0 | 1 | 1 | 0 | 1 |

The operation at combiner 197 is:

| | | | | | | | | |
|---|---|---|---|---|---|---|---|---|
| Majority output 193 = | 0 | 1 | 0 | 0 | 1 | 1 | 0 | 1 |
| C3′ = | 1 | 0 | 0 | 1 | 1 | 0 | 1 | 1 |
| Line 196 (Majority + C3′) = | 1 | 1 | 0 | 1 | 0 | 1 | 1 | 0 |

Performing digital integration it can be seen that the output of up/down counter 179 is + ¼ which indicates that the reconstructed bit of M2 on line 171 from line 145 is a 0, as was originally sent. Likewise, the output of up/down counters 189 and 199 are each − ¼, indicating that the reconstructed bit of M1 on line 181 from line 135, and of M3 on line 191 from line 155 are both 1, as was originally sent.

Thus it is seen that the line to line switching of FIG. 5 utilizing nonlinear multiplexing is also operative for quasi-orthogonal codes. It will be apparent to those skilled in the art that quasi-orthogonal codes also work for the linear multiplexed switching circuit of FIG. 3 and for the circuits of FIGS. 1A and 1B in a manner similar to that illustrated next above.

GROUP TO GROUP SWITCHING

Figure 6A:
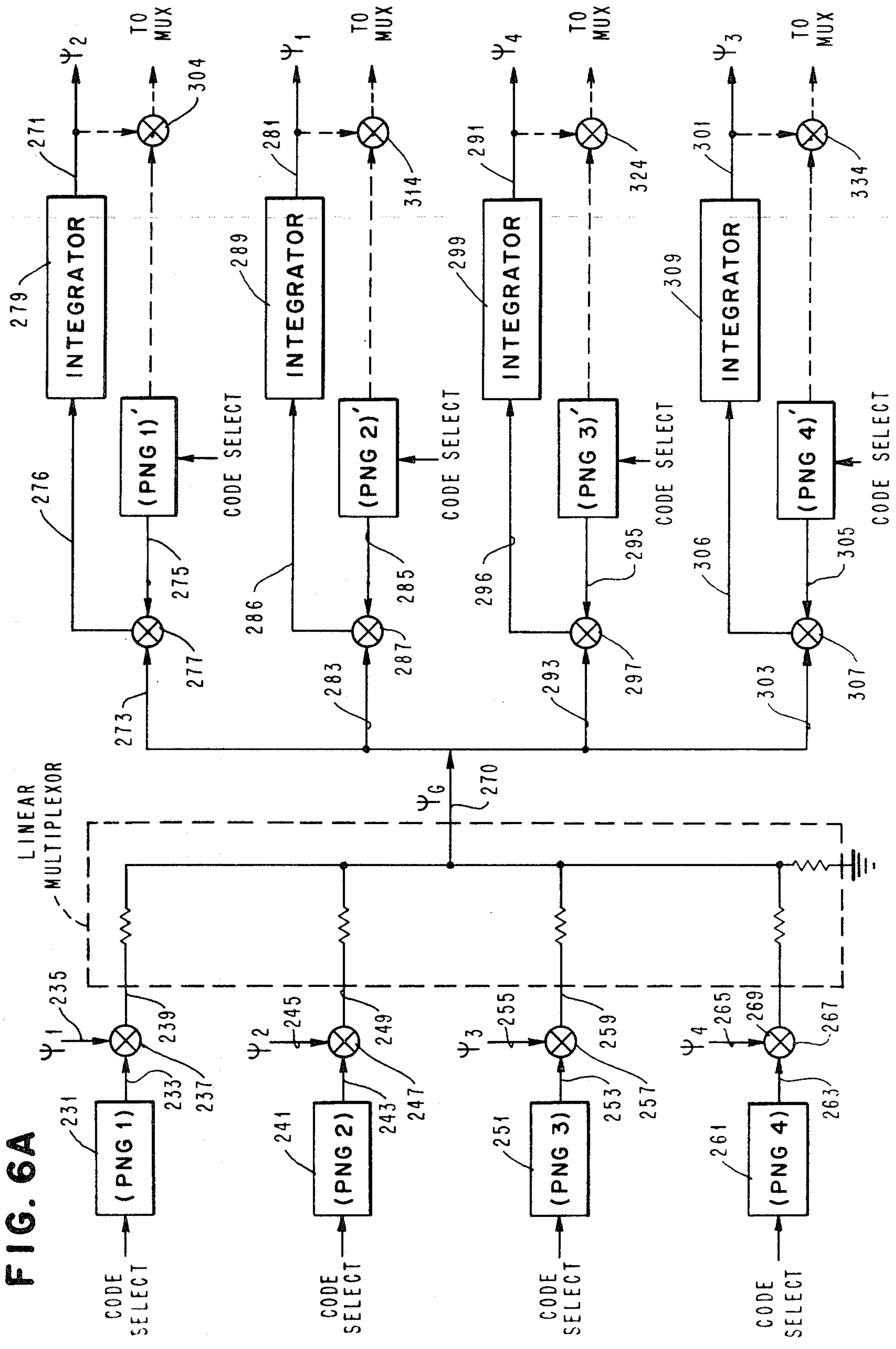
FIG. 6A is a representation of a group to group switch according to the invention.

Detailed Description of FIG. 6A

Figure 6B:
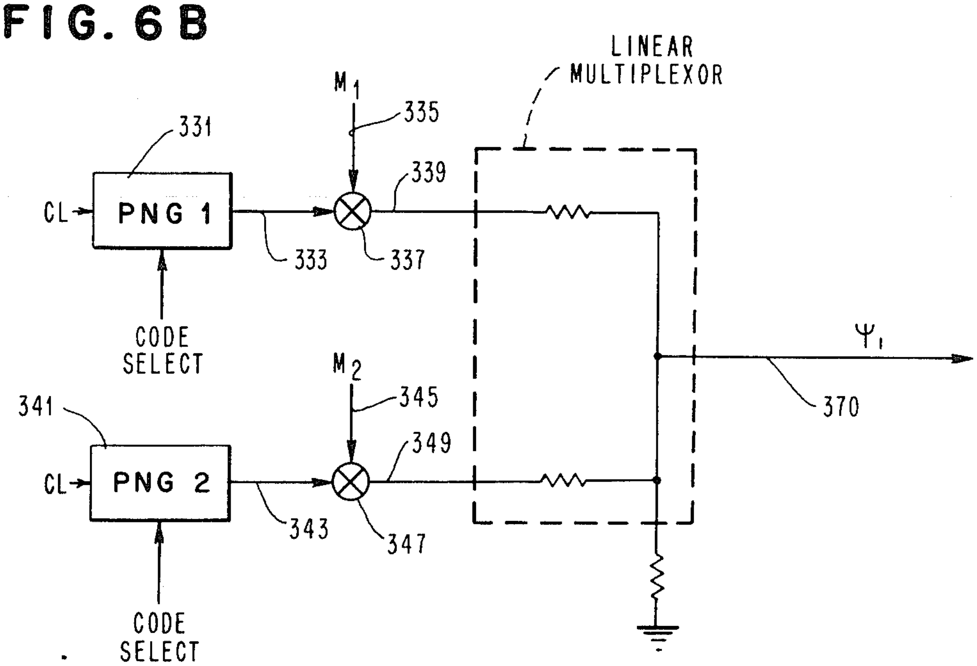
FIG. 6B is a representation of a circuit for forming a group of the type to be switched in FIG. 6A.

FIG. 6A shows a switching circuit for group to group switching. That is to say, a group of messages $\psi_1, \ldots, \psi_4$ is to be switched, respectively, from a group of sending lines 235, . . . 265, to a group of receiving lines 271, 281, 291, 301. The switching mechanism is similar to that shown in FIG. 3, but with vital modifications, as will hereinafter be described in detail. An illustration of forming a group of messages $\psi_1$ is seen in FIG. 6B. FIG.

Figures 7A, 7B:
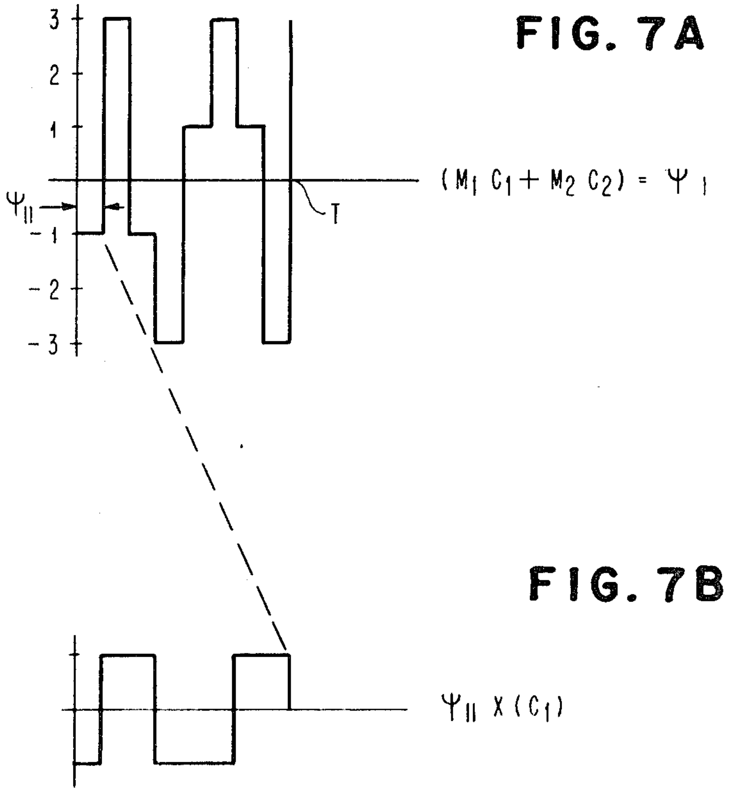
FIGS. 7A and 7B show a graphical representation of waveforms at various points in the group to group switch of FIG. 6A.

6B shows a circuit equivalent to the sending side of FIG. 3. However, only two messages are shown grouped for ease of illustration. PNG1 is initialized to generate PN sequence C1 when driven by a clock (not shown for ease of illustration). PNG2 is initialized so as to generate PN sequence C2 when driven by the same clock. Both sequences are orthogonal. As message M1 and message M2 are transmitted over lines 335 and 345, respectively, each is combined with its PN sequence C1, and C2 in combiners 337 and 347, respectively. The output of each individual combiner is fed to a linear multiplexer via lines 339 and 349, respectively. The linear multiplexer has an output 370 over which the formed group $\psi_1$ is transmitted. For a given message sample of M1 over predetermined interval T and of magnitude 1, and for a given message sample of M2 over predetermined interval T and of magnitude 2, the formed group $\psi_1$ is seen in FIG. 7A. As will be recognized, the formed group at this point is similar to that shown in FIG. 4G.

Detailed Description and Operation of FIG. 6A

Referring now to FIG. 6A, there is seen a switching circuit similar to that of FIG. 3. However, each pseudo-noise generator (PNG1), . . ., (PNG4), and (PNG1)', . . ., (PNG4)' are driven by a clock which is N times faster than the clock which drives the pseudo-noise generators which originally form the group as seen in FIG. 6B. Thus, each sample of a group is combined with a pseudo-noise sequence which is N times as fast as the original pseudo-noise sequence of the pseudo-noise generators forming the group. This is seen graphically in FIG. 7A. FIG. 7A illustrates the group $\psi_1$ and each individual bit of the group can be termed $\psi_{11}$. Referring again to FIG. 6A, the group of messages $\psi_1$ is transmitted along line 235 to combiner 237. $\psi_1$ is seen graphically in FIG. 7A. Each interval T of $\psi_1$ is combined with a PN sequence of N bits. Concurrently with the transmission of group $\psi_1$ over line 235, pseudo-noise generator (PNG1) is driven by a clock at N times the speed of the clock that drove the pseudo-noise generators of FIG. 6B. This is done for each sub-interval $\psi_{11}$ of FIG. 7A so that the pseudo-noise sequence C1 of (PNG1) is combined with each sub-interval of the incoming group as seen in the combination of FIGS. 7A and 7B. This forms an encoded group on line 239. A similar operation is performed for a second group $\psi_2$ with (PNG2), as well as for all other groups to be switched. Each group is fed into the linear multiplexer of FIG. 6A to form a group of groups $\psi_G$ on line 270. Taking groups $\psi_1$ and $\psi_2$ illustratively, and assuming $\psi_2$ is to be switched to line 271 and $\psi_1$ is to be switched to line 281, (PNG1)' will be initialized over the CODE SELECT line to the same initial condition as is (PNG2). (PNG2)' is initialized over the CODE SELECT line to the same initial condition as is (PNG1). Operation is now similar to that of FIG. 3 with the exception that groups are being operated upon rather than single messages. Thus the PN sequence from (PNG2)' will "pick out" the group $\psi_1$ and the PN sequence from (PNG1)' will "pick out" the group $\psi_2$. A further necessary modification is to shorten the integration time of each integrator 279, 289, 299, 309 from T to T/N for proper message recovery. The switch of FIG. 6A operates on a similar principle as that of FIG. 3 due to the recognition that if T is the duration of a message sample, then (T/N) is the duration of each bit of a PN sequence. Therefore, if each PN bit of duration (T/N) seen in FIG. 7A is multiplied by an orthogonal sequence (from a given (PNG) of FIG. 6A) of bit duration ($T/N^2$), then the resultant PN sequence will also be orthogonal so that the PN generators on the receiving side can "pick out" the desired group.

Again, as with the other switching circuits described, it will be apparent that the circuit of FIG. 6A is also operative utilizing quasi-orthogonal sequences.

It is to be noted that any of the above switching circuits can be made into a very secure switch by designing each PN generator to generate an extremely long code before it recycles.

A third group of combiner 304, 314, 324, and 334 is also shown in FIG. 6A for the purposes of indicating that the switching circuit of FIG. 6A can also be connected into a network having switching stages in series. Then it would be impossible for an unauthorized entity, without the prior knowledge of the PN sequence, to tap into the switch and thus intercept the message.

While the invention has been particularly shown and described with reference to preferred embodiments thereof, it will be understood by those skilled in the art that various changes in form and detail may be made without departing from the spirit and scope of the invention.

I claim:

1. Switching means for directly switching a message from a first line to a second line comprising, in combination:

a first line over which message samples of a predetermined time interval are transmitted;

a second line to which said message samples are to be switched;

clocking means for providing a time reference;

first generating means connected to said clocking means for generating a first psuedo-random sequence of duration equal to said predetermined time interval when driven by said clocking means;

first combining means connected to said first line and to said first generating means for combining said pseudo-random sequence with each of said message samples to form a first intermediate signal having successive predetermined time intervals equal to those of said message samples;

second generating means, synchronized with said first generating means, for generating a pseudo-random sequence identical with said first pseudo random sequence, said second generating means having a code select input for selectively initializing said second generating means to said predetermined sequence of said first generating means;

second combining means connected to said first combining means and to said second generating means for combining said identical pseudo-random sequence with said first intermediate signal; and integrating means having an input connected to said second combining means and an output connected to said second line, said integrating means synchronized with said first and second generating means, for reconstructing said message samples.

2. The combination of claim 1 wherein said first pseudo-random sequence is orthogonal.

3. The combination of claim 1 wherein said first pseudo-random sequence is quasi-orthogonal.

4. Switching means for directly switching a message from a first line to a second line comprising, in combination:

a first line over which message samples of a predetermined time interval are transmitted;

a second line to which said message samples are to be switched;

clocking means for providing a time reference;

first generating means connected to said clocking means for generating a first pseudo-random sequence of duration equal to said predetermined time interval when driven by said clocking means;

frequency multiplying means connected to said clocking means for generating frequencies which are multiples of a frequency of said clocking means;

first combining means connected to said frequency multiplying means and to said first generating means, for forming a first intermediate signal having successive predetermined time intervals equal to those of said message samples;

second combining means connected to said first combining means and to said first line for forming a second intermediate signal having successive predetermined time intervals equal to those of said message samples;

second generating means, synchronized with said first intermediate signal for generating a pseudo-random sequence identical to said first pseudo-random sequence, said second generating means having a code select input for selectively initializing said second generating means to said predetermined sequence of said first generating means;

third combining means connected to said second generating means and to said second combining means for combining said identical pseudo-random sequence with said second intermediate signal during said successive predetermined time intervals to form intermediate signals; and integrating means connected to said second line and to said third combining means, and synchronized with said first and second generating means to reconstruct said message samples on said second line.

5. The combination of claim 4 wherein said pseudo-random sequence is orthogonal.

6. The combination of claim 4 wherein said pseudo-random sequence is quasi-orthogonal.

7. Switching means for directly switching a message from a sending line in a group of sending lines to a receiving line in a group of receiving lines comprising, in combination:

a first group of sending lines, each individual sending line of said group for transmitting a message comprising message samples having a predetermined time interval;

A first group of synchronized individual generating means, each of said individual means generating a pseudo-random sequence;

a first group of combining means, each individual member of said group connected to one of said sending lines and to one of said individual generating means of said first group of generating means for combining said message on said one of said sending lines with said pseudo-random sequence from said one of said individual generating means, for forming a first intermediate signal having successive predetermined intervals equal to those of said message samples;

multiplexing means connected to each of said first group of combining means for combining each of said first intermediate signals into a group of first intermediate signals;

a group of receiving lines, each line for receiving a message switched from one of said group of sending lines;

a second group of individual generating means synchronized with said first group of individual generating means, each of said second group of generating means generating a pseudo-random sequence identical to a pseudo-random sequence generated by one of said generating means of said first group of individual generating means, each of said individual generating means of said second group having a code select input for initializing each of said individual generating means of said second group to said predetermined sequence of any of at least one of said individual generating means of said first group;

a second group of combining means, each individual member of said group connected to said multiplexing means and to one of said individual generating means of said second group of individual generating means, each of said second group of combining means forming a second intermediate signal;

a group of integrating means synchronized with said first and second group of generating means, each member of said group of intergrating means connected to one of said second group of combining means and to one of said group of receiving lines and accepting said second intermediate signal from said one of said second group of combining means to reconstruct said message transmitted on said individual sending line.

8. The combination of claim 7 wherein said multiplexing means is linear and said pseudo-random sequences are orthogonal.

9. The combination of claim 7 wherein said multiplexing means is linear and said pseudo-random sequences are quasi-orthogonal.

10. The combination of claim 7 wherein said multiplexing means is nonlinear and said pseudo-random sequences are orthogonal.

11. The combination of claim 7 wherein said multiplexing means is nonlinear and said pseudo-random sequences are quasi-orthogonal.

12. Switching means for multiplexing a plurality of groups of messages onto a group of sending lines and for switching said groups of messages from any one of said group of sending lines to any one of a group of receiving lines comprising, in combination:

a plurality of message group forming means for forming message groups, each message group of said message groups comprising messages made up of message samples having a predetermined time interval, each of said plurality of message group forming means including:

a first group of generating means, each generating means of said first group of generating means being driven at a predetermined clock rate, and each having a code select input for initializing said generating means to a predetermined pseudo-random sequence of length N at said clock rate and providing said pseudo-random sequence at an output, a first group of combining means, each combining means of said first group of combining means having a first input for receiving a message made up of message samples and a second input for receiving the output of a different one of said generating means of said first group of generating means, a multiplexing means connected to an output of each combining means of said first group of combining means, said multiplexing means providing an output which is a signal representative of a group of messages;

a group of sending lines, each sending lines of said group of sending lines being connected to the output of said multiplexing means of a different one of said plurality of message group forming means for accepting one of said message groups therefrom;

a group of receiving lines, each receiving line of said group of receiving lines for receiving one of said message groups;

group switching means connected to each of said sending lines and connected to each of said receiving lines for switching any message group on any of said sending lines onto any of said receiving lines, said group switching means including:

a second group of generating means driven at N times said clock rate, each generating of said second group of generating means being synchronized with said first group of generating and generating at an output, a pseudo-random sequence of length N, N times during said predetermined time interval;

a second group of combining means, each combining means of said second group of combining means having a first input connected to one of said sending lines and having a second input connected to an output of a different one of said generating means of said second group of generating means, each combining means of said second group of combining means providing an encoded group signal at its output, second multiplexing means having a plurality of inputs each input of said plurality of inputs being connected to an output of a different one of said second group of combining means for combining said encoded group signals into a group of group signals, a third group of combining means, each combining means of said third group of combining means having a first input connected to said output of said second multiplexing means, a third group of generating means synchronized with said second group of generating means, said third group of generating being driven at N times said clock rate, each generating means of said third group of generating means having a code select input for initializing each generating means of said third group of generating means to generate a pseudo-random sequence identical to that generated by any generating means of said second group of generating means, each generating means of said third generating means providing said pseudo-randam sequence at a second input of a different combining means of said third group of combining means, a group of integrating means, each integrating means of said group of integrating means having an output connected to a different one of said receiving lines and an input connected to an output of a different one of said combining means of said third group of combining means for reconstructing one of said message groups to be received by one of said receiving lines.

13. The combination of claim 12 wherein said second multiplexing means are linear and said pseudo-random sequences generated by said second group of generating means are orthogonal.

14. The combination of claim 12 wherein said second multiplexing means are linear and said pseudo-random sequences generated by said second group of generating means are quasi-orthogonal.

15. The combination of claim 12 wherein said second multiplexing means are nonlinear and said pseudo-random sequences generated by said second group of generating means are orthogonal.

16. The combination of claim 12 wherein said second multiplexing means are nonlinear and said psuedo-random sequences generated by said second group of of generating means are quasi-orthogonal.

* * * * *

PO-1050
(5/69)

UNITED STATES PATENT OFFICE
CERTIFICATE OF CORRECTION

Patent No. 3,715,508 Dated February 6, 1973

Inventor(s) HERMAN L. BLASBALG

It is certified that error appears in the above-identified patent and that said Letters Patent are hereby corrected as shown below:

Column 8, line 13, "1 1 1 - -1 1 -1 -1" should read --C1 1 1 1 -1 -1 1 -1 -1--.
Column 10, line 19, "variations" should read --combiners--.

Signed and sealed this 3rd day of December 1974.

(SEAL)
Attest:

McCOY M. GIBSON JR.
Attesting Officer

C. MARSHALL DANN
Commissioner of Patents

WA9-67-011